United States Patent [19]

Phillips

[11] Patent Number: 4,714,429

[45] Date of Patent: Dec. 22, 1987

[54] ARITHMETIC EDUCATIONAL DEVICE

[76] Inventor: Morton Phillips, 67-70 Yellowstone Blvd., Forest Hills, N.Y. 11375

[21] Appl. No.: 945,369

[22] Filed: Dec. 22, 1986

[51] Int. Cl.$^4$ .............................................. G09B 19/02
[52] U.S. Cl. ...................................................... 434/198
[58] Field of Search ............................... 434/198, 206

[56] References Cited

U.S. PATENT DOCUMENTS

| 463,230 | 11/1891 | Hooly | 434/206 |
|---|---|---|---|
| 731,175 | 6/1903 | Goodman | 434/206 |
| 924,406 | 6/1909 | Walker | 434/198 X |
| 969,429 | 9/1910 | Warfield | 434/206 |
| 2,158,431 | 5/1939 | Sanders | 434/198 X |
| 2,533,569 | 12/1950 | Espinola | 434/206 X |
| 2,591,327 | 4/1952 | Witter et al. | 434/198 |

FOREIGN PATENT DOCUMENTS

| 840020 | 5/1952 | Fed. Rep. of Germany | 434/198 |
|---|---|---|---|
| 327286 | 7/1935 | Italy | 434/198 |
| 507501 | 12/1954 | Italy | 434/198 |
| 986698 | 3/1965 | United Kingdom | 434/198 |

Primary Examiner—William H. Grieb
Attorney, Agent, or Firm—Darby & Darby

[57] ABSTRACT

An educational device comprises an outer cylinder and an inner cylinder within said outer cylinder. The inner cylinder has an end extending from the outer cylinder and is rotatable and axially movable with respect to the outer cylinder. The inner cylinder has a series of multipliers (for example) peripherally arrayed around the end extending from the outer cylinder. The outer cylinder includes a series of windows and a series of multiplicands peripherally arrayed around the end from which the inner cylinder extends such that each of the multiplicands can be aligned with each of the multipliers by rotating one of the cylinders. The inner cylinder further includes rows of products physically arranged relative to the windows so that the products do not appear in the windows when the inner cylinder extends from said outer cylinder but do appear in the windows when said inner cylinder is inserted into said outer cylinder so as to display the product of the selected multiplier and multiplicand.

7 Claims, 5 Drawing Figures

U.S. Patent   Dec. 22, 1987   Sheet 1 of 2   4,714,429
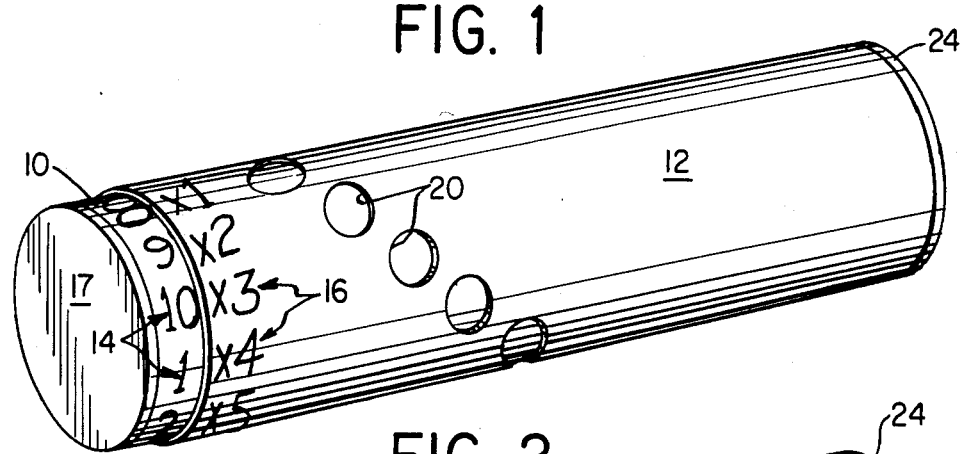
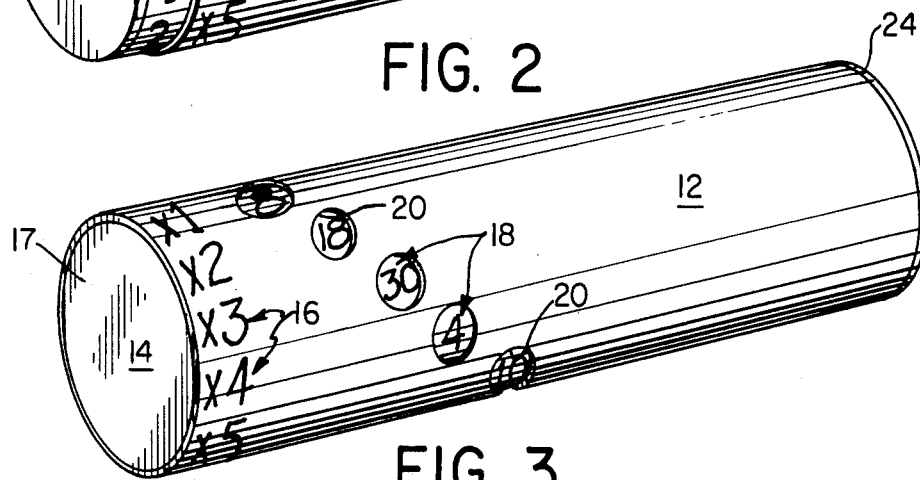
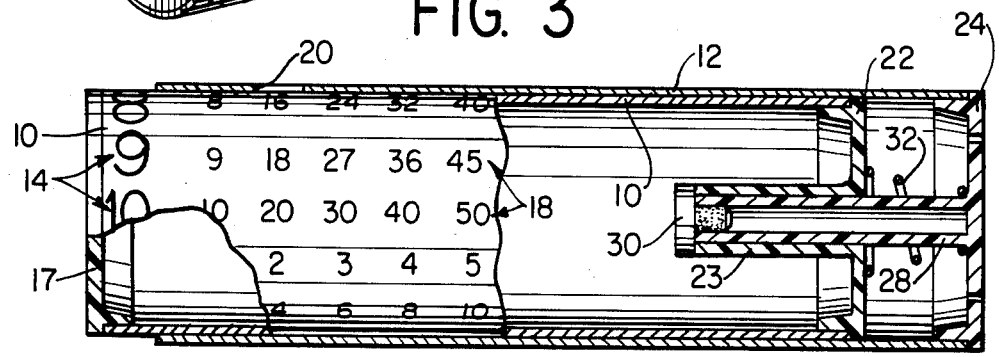

ARITHMETIC EDUCATIONAL DEVICE

This invention relates to an educational device for teaching children basic arithmetic operations, particularly multiplication.

Numerous educational devices have been proposed to teach children mathematical operations, particularly multiplication. Espinola U.S. Pat. No. 2,533,569 discloses a calculator in which an inner cylinder contains an array of multipliers peripherally arranged around one end and a series of products arranged in columns aligned with respective multipliers. The inner cylinder rotates within a slotted outer cylinder and each of the products is obscured by a movable band corresponding to a selected multiplicand. Movement of a selected band causes the product of (a) the multiplier appearing in the slot and (b) the multiplicand corresponding to that band to appear in the space created by moving the band. While Espinola is similar in basic concept to this invention, the device is more complex because of the need to use a multiplicity of separately movable bands and less attractive to young children.

Analogous educational devices of the type to which this invention pertains are also shown in Warfield U.S. Pat. No. 969,429; Hooly U.S. Pat. No. 463,230 and Goodman U.S. Pat. No. 731,175.

It is a principal object of this invention to provide an educational device for teaching mathematical operations which is inexpensive, easy to use and attractive to young children.

Briefly, in accordance with the invention, an inner cylinder is arranged for rotation within an outer cylinder. The inner cylinder contains a number of multipliers (for example) peripherally arrayed around one end extending from the outer cylinder and a row of products aligned with each multiplier. The outer cylinder contains a series of multiplicands (for example) each of which can be aligned with any one of the multipliers on the inner cylinder. In addition, the outer cylinder contains a number of windows at predetermined locations adapted to overlie the product of the multiplier and multiplicand when the two are aligned. The products normally are obscured by the wall of the outer cylinder, but when the inner cylinder is pushed into the outer cylinder, the product of the selected multiplier and multiplicand appears in the window.

THE DRAWINGS

FIG. 1 is a perspective view of one embodiment of the invention showing the inner and outer cylinders with the inner cylinder extending from the outer cylinder;

FIG. 2 is a perspective view similar to FIG. 1 showing the inner cylinder inserted into the outer cylinder and the product displayed in the various windows;

FIG. 3 is a partial cross-sectional view of the embodiment of FIG. 1;

DETAILED DESCRIPTION

Figure 5:
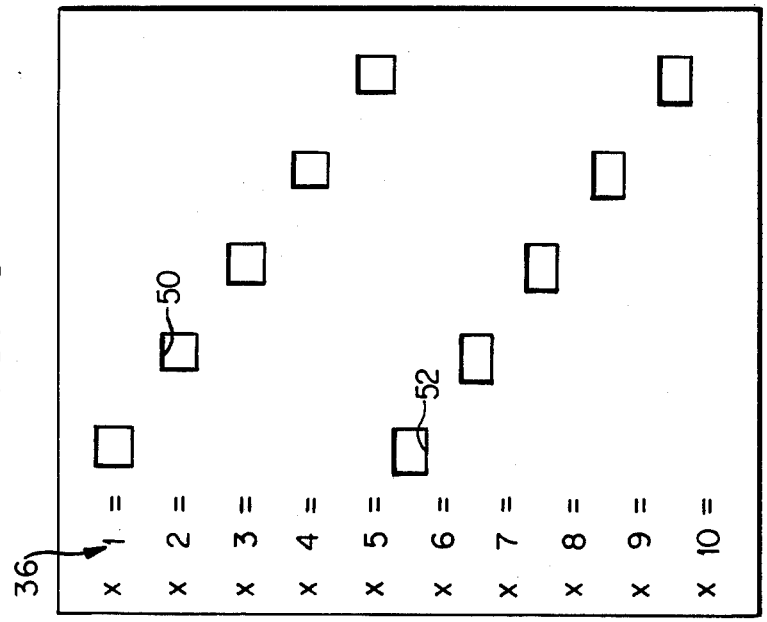
FIG. 5 shows the layout of the numerals on the outer cylinder according to such preferred embodiment.

While the invention can be used with any arithmetic operation, in its preferred embodiment it is contemplated that the invention will be used to teach multiplication tables to young children; accordingly, the invention is described as a device for teaching multiplication.

In accordance with the invention, an inner cylinder 10 is positioned within an outer cylinder 12 and disposed for relative rotation. The inner cylinder 10 contains an array of multipliers 14 peripherally arrayed around one end of the inner cylinder which extends from outer cylinder 12. The outer cylinder 12 contains a similar array of multiplicands 16 arrayed around the end of the cylinder 12 such that each multiplicand can be aligned with each of the respective multipliers 14. The end of inner cylinder 10 extending from outer cylinder 12 may be closed by a press fit cap 17.

As shown in FIG. 3, the inner cylinder 10 also includes a multiplicity of products 18 disposed in rows over a substantial portion of its length. Each row of products 18 is aligned with a multiplier 14 and each product in a row corresponds to the product of its aligned multiplier and one of the multiplicands 16. Each of these products 18 is physically spaced in relation to a set of windows 20 in the outer cylinder 12 so that the product of a selected multiplier and the multiplicand with which it is aligned will appear in the windows when the inner cylinder 10 is inserted into the outer cylinder 12.

For example, referring to FIG. 3, adjacent to the multiplier "9" there appears a row of products "9", "18", "27", etc. Each of these products corresponds to the multiplication product of multiplier "9" and the respective multiplicands "1", "2", "3", etc. When the inner and outer cylinders are arranged as shown in FIG. 1 (i.e. with multiplier "9" aligned with the multiplicand "2"), the positions of the windows are such that no product appears in the window aligned with the multiplicand "2". However, when the inner cylinder is pushed into the outer cylinder 12 (as shown in FIG. 2), the various products come into view within the windows 20 and thus the user observes that the product of "9" times "2" is "18", the product of "10" times "3" is "30", etc.

In the preferred embodiment, the inner cylinder 10 may be spring biased to its extended position shown in FIG. 1. For this purpose, inner cylinder 10 includes a press fit end cap 22 which includes an inwardly extending cylindrical sleeve 23. The outer cylinder 12 is closed by an end cap 24 which includes an integrally formed hollow cylindrical post 28 on which the sleeve 23 can slide. The hollow post 28 is closed by a plug 30 which, as shown in FIG. 3, is adapted to abut against the innermost extremity of sleeve 23. A coil spring 32 between caps 22 and 24 biases the two cylinders apart with plug 30 limiting the relative movement of the cylinders. Thus, when the user pushes the inner cylinder 10 into the outer cylinder 12, he does so against the force of spring 32 which, consequently, returns the cylinders to the position shown in FIG. 1 when the force is removed.

Figure 4:
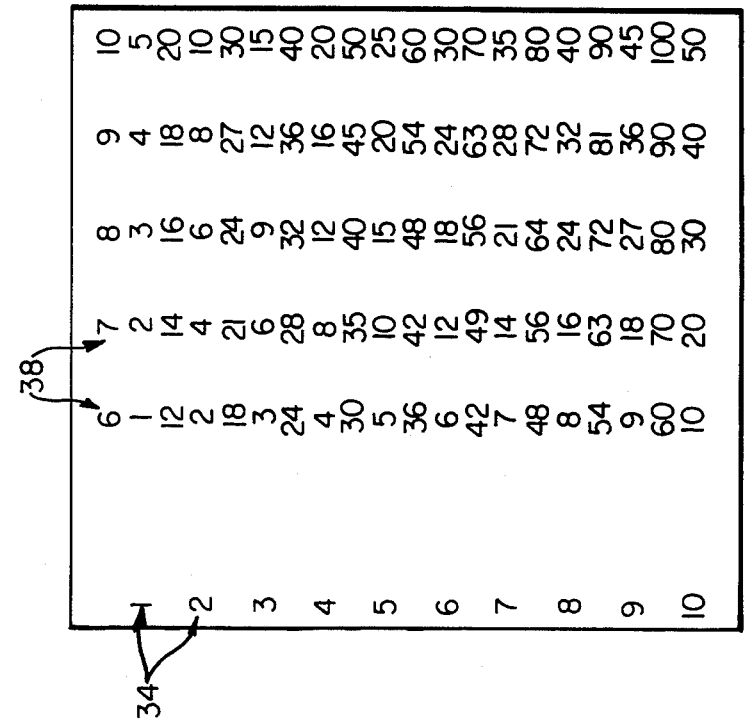
FIG. 4 shows the layout of the numerals on the inner cylinder according to a prefered embodiment.

With the embodiment shown in FIGS. 1-3, to provide the capability of multiplying ten multipliers (e.g., "1"-"10") by ten multiplicands (e.g., "1"-"10"), a relatively long device is required. FIGS. 4 and 5 show the layout of an inner cylinder and outer cylinder, respectively, wherein the same capacity is provided with a shorter device of only slightly greater diameter.

Referring to FIG. 4, the inner cylinder comprises multiplicands 34 and a multiplicity of products 38. Whereas in the embodiment of FIGS. 1-3, each multiplicand was associated with a single row of products, in the embodiments of FIGS. 4 and 5, each row of products is divided into two rows. For example, the multiplicand "1" is aligned with the products "1" through "5". Spaced immediately above these products is a second row of the products "6" through "10", this second column not being aligned directly with the multiplicand "1". The reason for this is explained below.

The outer cylinder, shown in its layout form in FIG. 5, includes the multipliers 36 in which the multipliers "1" through "5" are associated with windows 50 and the multipliers "6" through "10" are associated with windows 52. The windows 50 are aligned horizontally with the multipliers "1" through "5" and the windows 52 are offset above the multipliers "6" through "10". Accordingly, products appearing in the row aligned with the multiplicand are displayed in the windows 50 whereas the products appearing in the row immediately above the aligned row will appear in the offset windows 52. Because of this arrangement, it is possible to reduce the length of the outer cylinder by 50% while increasing the circumference to the extent required to provide two rows of products for each multiplicand.

Referring to the prior example, if the inner and outer cylinders are arranged so that multiplier "9" is aligned with multiplicand "2", the product "18" will appear in the window 50 aligned with the multiplier "2". If the multiplicand "9" is aligned with the multiplier "6", the product "54" will appear in the window 52 associated with the multiplier "6" but offset as shown in FIG. 5.

Thus, by arranging the products 38 in two rows with one row representing the product of the associated multiplicand and the multipliers "1" through "5" and the other offset row representing the product of the multiplicand and the multipliers "6" through "10", it is possible to reduce the size of the device to a size which is convenient for small children.

There are various modifications of the invention which are possible in accordance with the invention. The capacity of the device can be increased by providing a pair of inner cylinders cooperating with a single outer cylinder so that the two cylinders can be operated from either end of the device. Since it is obviously desirable to read the arithmetic operations from left to right, if two cylinders are used, the numerals on one side will be upside down relative to the numerals on the other side. This means that the device must be turned over for normal reading. With such an arrangement, the inner cylinders may move together or each may be moved independently of the other. The use of two cylinders can provide the capability of different mathematical operations using a single device.

What is claimed is:

1. An educational device comprising an outer cylinder and an inner cylinder within said outer cylinder, said inner cylinder having an end extending from said outer cylinder and being rotatable and axially movable with respect to said outer cylinder, said inner cylinder having a series of first numbers peripherally arrayed around the end extending from said outer cylinder, said outer cylinder including a series of windows and a series of second numbers peripherally arrayed around the end from which the inner cylinder extends such that each of said second numbers can be aligned with each of said first numbers when said end of the inner cylinder extends from the outer cylinder by rotating one of said cylinder, said inner cylinder further including rows of third numbers corresponding to an arithmetic operation between said first numbers and said second numbers, said third numbers being physically arranged on said inner cylinder relative to said windows so that said third numbers do not appear in said windows when said inner cylinder extends from said outer cylinder but said third numbers appear in said windows when said inner cylinder is inserted into said outer cylinder so as to reflect the result of an arithmetic operation between aligned first and second numbers.

2. An educational device according to claim 1, including means for retaining said inner cylinder within said outer cylinder and means for spring biasing said inner cylinder to the position where it extends from said outer cylinder.

3. An educational device according to claim 2, wherein said retaining means comprises:
   an inner cap including an integral sleeve closing the end of the inner cylinder within said outer cylinder;
   an end cap including a hollow cylindrical post adapted to slide within said inner sleeve closing the adjacent end of said outer cylinder; and
   a plug closing the innermost end of said cylindrical post and adapted to abut against the innermost end of said cylindrical sleeve.

4. An educational device according to claim 3, further including a coil spring between said inner and outer caps.

5. An educational device according to claim 1, wherein said first numbers comprise multipliers, said second numbers comprise multiplicands, and said third numbers comprise products of said multipliers and multiplicands.

6. An educational device according to claim 1, wherein said third numbers are arranged in rows, there being at least two rows of third numbers associated with each of said second numbers and wherein the windows associated with some of said first numbers are aligned with said first number to display third numbers in one of said rows and the windows associated with others of said first numbers display third numbers lying in the second of said rows.

7. An educational device according to claim 5, wherein said products are arranged in rows, there being at least two rows of products associated with each of said multiplicands and wherein the windows associated with some of said are aligned with said multiplier to display products in one of said rows and the windows associated with others of said multipliers display products lying in the second of said rows.

* * * * *